(12) United States Patent
Sugihara et al.

(10) Patent No.: US 8,100,526 B2
(45) Date of Patent: Jan. 24, 2012

(54) EYEGLASS-TYPE IMAGE DISPLAY DEVICE AND AN EYEGLASS FRAME USED THEREFOR

(75) Inventors: Ryohei Sugihara, Machida (JP); Seiji Tatsuta, Hachioji (JP); Yoichi Iba, Hachioji (JP); Teruo Tomita, Kawasaki (JP)

(73) Assignee: Olympus Corporation, Tokyo (JP)

( * ) Notice: Subject to any disclaimer, the term of this patent is extended or adjusted under 35 U.S.C. 154(b) by 120 days.

(21) Appl. No.: 12/729,596

(22) Filed: Mar. 23, 2010

(65) Prior Publication Data

US 2010/0245755 A1   Sep. 30, 2010

(30) Foreign Application Priority Data

Mar. 25, 2009   (JP) ................................. 2009-074809

(51) Int. Cl.
*G02C 1/00* (2006.01)
(52) U.S. Cl. ........................................ 351/158; 359/630
(58) Field of Classification Search .................... 351/41, 351/158; 359/629, 630
See application file for complete search history.

(56) References Cited

U.S. PATENT DOCUMENTS

| 2009/0251661 A1* | 10/2009 | Fuziak, Jr. ..................... 351/158 |
| 2010/0141892 A1* | 6/2010 | Moliton et al. ............... 351/158 |

FOREIGN PATENT DOCUMENTS

JP   2008-067285   3/2008

* cited by examiner

*Primary Examiner* — Huy K Mai
(74) *Attorney, Agent, or Firm* — Scully, Scott, Murphy & Presser, P.C.

(57) ABSTRACT

An eyeglass-type image display device mounted on an eyeglass frame and has a display element for displaying an image and a light guiding unit for guiding the image light of the image displayed on the display element 15 is provided, wherein at least the light guiding unit is disposed on a limb unit so as to be displaceable to a first position where the light guiding unit is evacuated from the front of one eyeball of the user and to the second position where the light guiding unit extends to the front of the eyeball and the image light exits therethrough toward the eyeball, thereby enabling compact and light-weight structure, reduction in cost, and further enabling the user to wear the eyeglass frame for a long time without feeling that the eyeglass frame is heavy.

10 Claims, 15 Drawing Sheets

FIG. 3
(a)
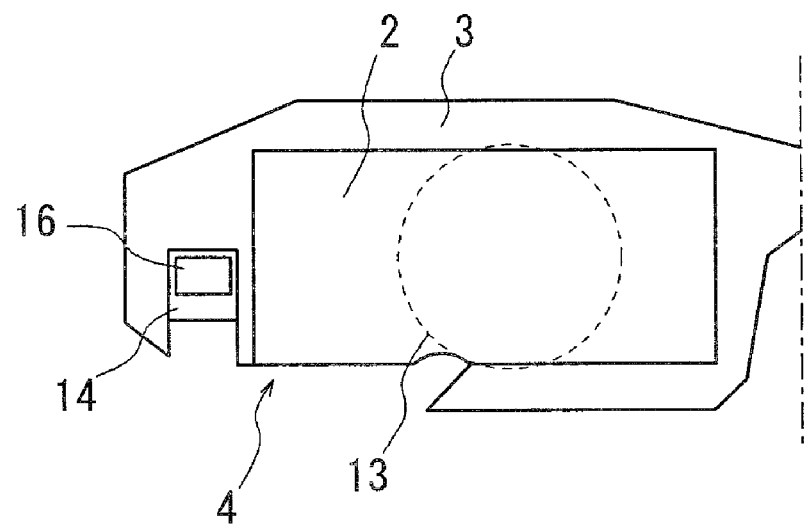
(b)
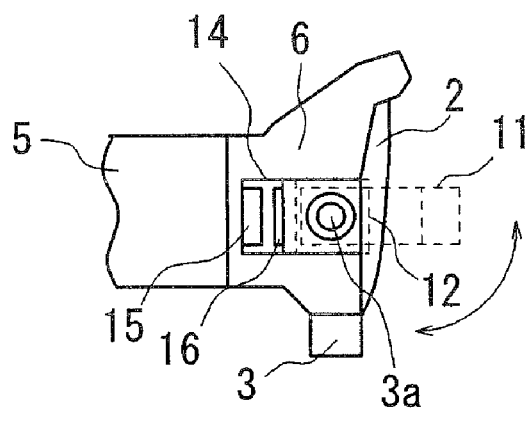
(c)
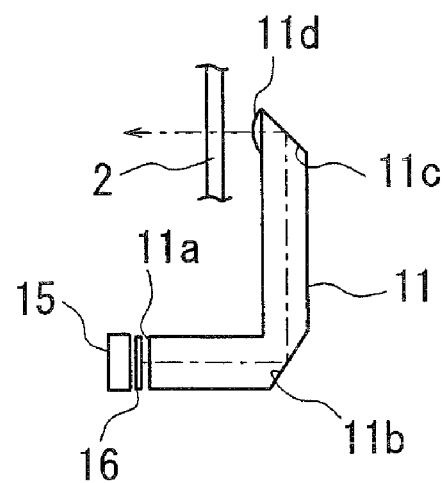

FIG. 6
(a)
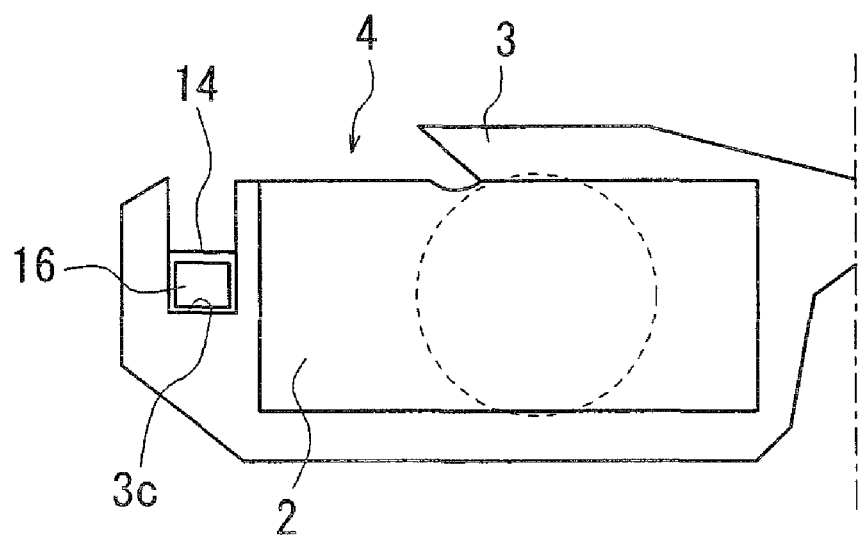
(b)
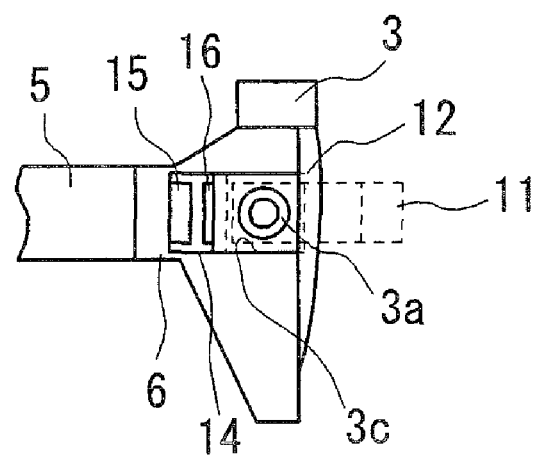

FIG. 9
(a)
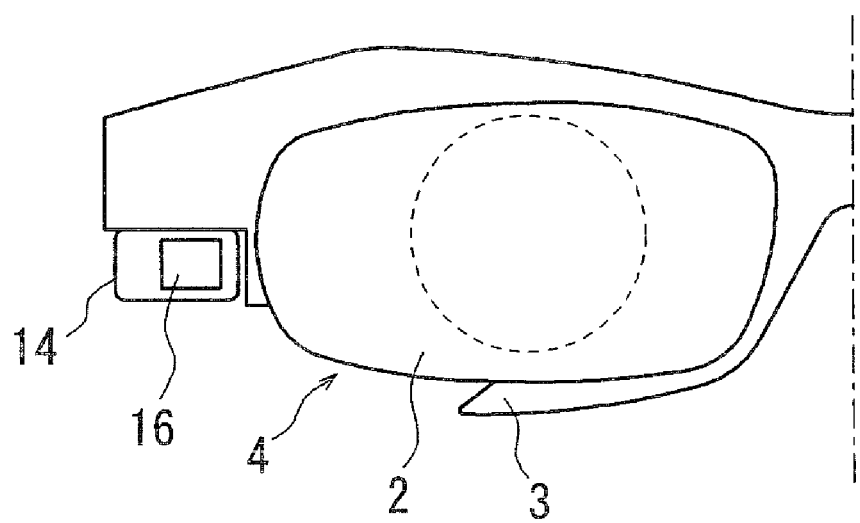
(b)
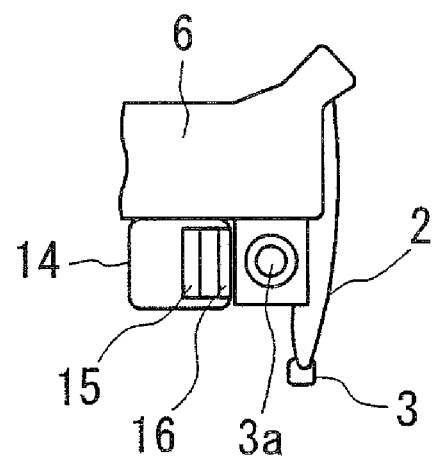

EYEGLASS-TYPE IMAGE DISPLAY DEVICE AND AN EYEGLASS FRAME USED THEREFOR

CROSS-REFERENCE TO RELATED APPLICATION

The present application claims priority from Japanese Application No. 2009-074809 filed on Mar. 25, 2009, the content of which is incorporated herein by reference.

FIELD OF THE INVENTION

The present invention relates to an eyeglass-type image display device and an eyeglass frame used therefor.

BACKGROUND OF THE INVENTION

As disclosed by JP 2008-67285 A, for example, an eyeglass-type image display device that includes, for example, a body unit fixed to a temple of an eyeglass frame and an image display unit that is movable to a standby position adjacent to the body unit and to a use position immediately in front of an eyeglass lens, and causes the body unit to automatically move the image display unit to the standby position and to the use position is known.

However, with respect to the aforementioned image display device disclosed by JP 2008-67285 A, in order to move the image display unit to the standby position and to the use position automatically, the body unit has a built-in driving mechanism such as a motor and a worm gear, and a guide rail and the like that extends from the body unit and guides the movement of the image display unit is provided.

Consequently, there is concern that a device becomes large scale, thereby causing an increase in the cost. In addition, in the case where the image display unit is located on the standby position, there is concern that the user feels the image display unit, the guide rail and the like as eyesores and that when seeing from the third person, the body unit, the image display unit and the like project greatly from the eyeglass frame, which may impair the aesthetic look as a pair of eyeglasses. Further, increased weight may increase the load applied to the nose and ears of the user when he/she wears the pair of eyeglasses, thereby making it difficult for the user to wear the pair of eyeglasses for a long period of time.

Accordingly, in view of the aforementioned problem, an object of the present invention is to provide an eyeglass-type image display device and an eyeglass frame used therefor that can be configured easily and reduce costs, in addition, is compact and light-weight and does not impair the appearance and aesthetic look as a pair of eyeglasses, and further can be worn safely by the user for a long period of time without making the user to feel that the device is heavy.

SUMMARY OF THE INVENTION

The first aspect of the invention which achieves the aforementioned object is an eyeglass-type image display device including a display element for displaying an image and a light guiding unit for guiding an image light of an image displayed on the display element, wherein in a state where the user wears an eyeglass frame, at least the light guiding unit is disposed on a limb unit of the eyeglass frame so as to be displaceable to a first position where the light guiding unit is evacuated from the front of one eyeball of the user and to a second position where the light guiding unit extends to the front of the eyeball and the image light exits therethrough toward the eyeball.

The second aspect of the invention resides in the eyeglass-type image display device according to the first aspect, the light guiding unit has a shape that forms a part of outer shape of the limb unit on the first position.

The third aspect of the invention resides in the eyeglass-type image display device according to the first aspect, the light guiding unit is provided on the limb unit so as to be rotatable to the first position and to the second position.

The fourth aspect of the invention resides in the eyeglass-type image display device according to the first aspect, the light guiding unit is provided on the limb unit so as to be slidable to the first position and to the second position.

The fifth aspect of the invention resides in the eyeglass-type image display device according to the first aspect, the display element is separated from the light guiding unit and is provided on the eyeglass frame so that it is opposed to an image light entering end of the light guiding unit in a state where the light guiding unit is located on the second position.

The sixth aspect of the invention resides in the eyeglass-type image display device according to the first aspect, the display element is provided on the image light entering end of the light guiding unit so as to be integral and movable with the light guiding unit.

The seventh aspect of the invention resides in the eyeglass-type image display device according to the first aspect, with respect to the light guiding unit, a width of a projected cross-section in a visual axis direction of the user is, on the second position, equal to or less than 4 mm, which is smaller than a diameter of a pupil of the eyeball.

The eighth aspect of the invention resides in the eyeglass-type image display device according to the first aspect, the light guiding unit is configured so that, in a state where the light guiding unit is located on the second position, the image light from the display element passes outside an eyeglass lens and enters into the light guiding unit and the image light that exits from the light guiding unit transmits the eyeglass lens and is incident on the eyeball.

Further, the ninth aspect of the invention, which achieves the aforementioned object is an eyeglass frame used for the eyeglass-type image display device according to the fifth aspect, including
 a light guiding unit mounting unit for mounting the light guiding unit displaceably to the first position and to the second position;
 a notch part formed in a limb unit so that the light guiding unit is located on the limb unit on the first position; and
 a display element loading unit for loading the display element.

Further, the tenth aspect of the invention, which achieves the aforementioned object is an eyeglass frame used for the eyeglass-type image display device according to the sixth aspect, including
 a light guiding unit mounting unit for mounting the light guiding unit that is integrally provided with the display element so as to be displaceable to the first position and to the second position; and
 a notch part formed in a limb unit so that the light guiding unit is located on the limb unit on the first position.

According to the eyeglass-type image display device in accordance with the present invention, the light guiding unit that guides the image light from the display element is disposed on the limb unit of the eyeglass frame so as to be displaceable to the first position where the light guiding unit is evacuated from the front of the eyeball and to a second position where the light guiding unit extends to the front of the eyeball and the image light can exit therethrough toward the eyeball, thereby making the structure simple, compact and light weight, which enables cost reduction and does not impair the aesthetic look as a pair of eyeglasses, and further enables the user to wear the pair of eyeglasses for a long period of time with ease without feeling that the pair of eyeglasses is heavy.

Further, according to the eyeglass frame in accordance with the present invention, it is possible to provide an eyeglass frame that can constitute an eyeglass-type image display device that produces the aforementioned operations and effects easily.

BRIEF DESCRIPTION OF THE DRAWING

FIG. 3 is a partial schematic view of the eyeglass-type image display device shown in FIG. 1.

FIG. 6 is a partial schematic view of the eyeglass-type image display device shown in FIG. 4.

FIG. 9 is a partial schematic view of the eyeglass-type image display device shown in FIG. 7.

DESCRIPTION OF THE PREFERRED EMBODIMENTS

The embodiments of the present invention are illustrated below with reference to the drawings.

First Embodiment

Figure 1:
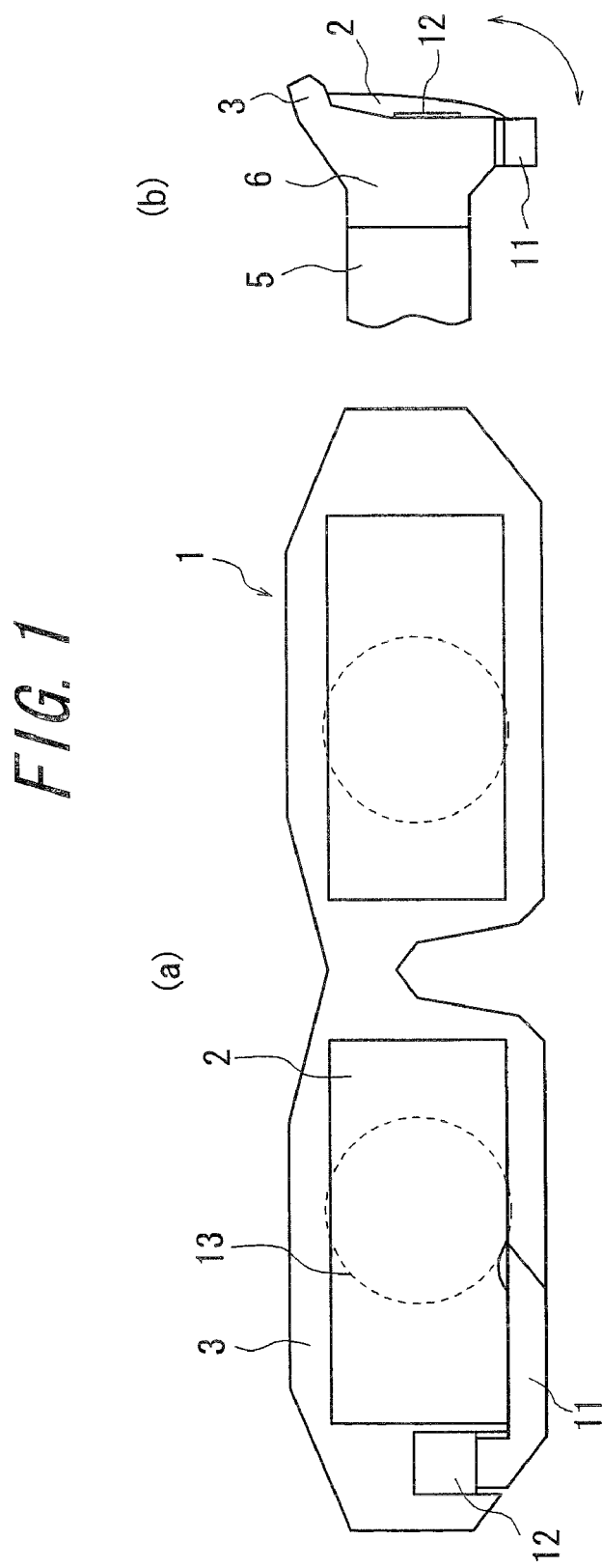
FIG. 1 is an elevation view and a side view showing an image non-observing state of an eyeglass-type image display device in accordance with a first embodiment of the present invention.
Figure 2:
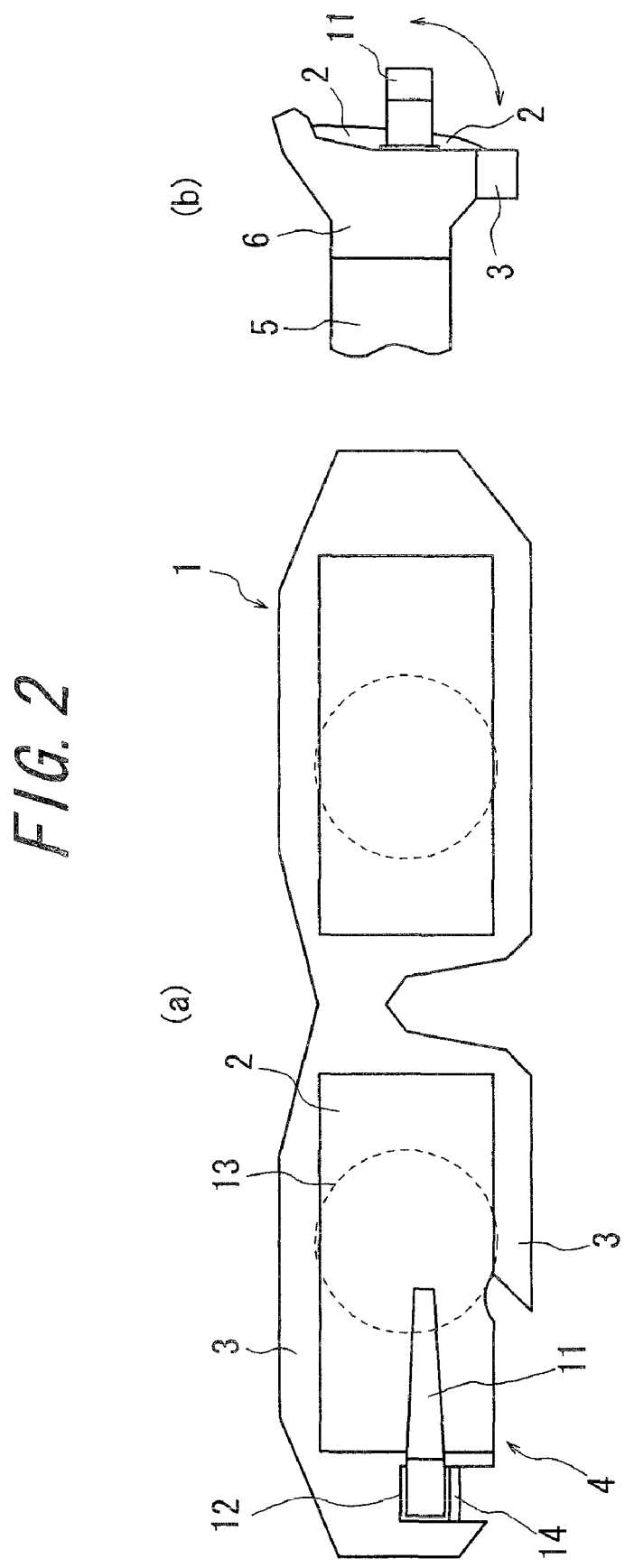
FIG. 2 is an elevation view and a side view showing an image observable state of the eyeglass-type image display device shown in FIG. 1.

FIGS. 1 to 3 show a schematic diagram of an eyeglass-type image display device in accordance with a first embodiment of the present invention. FIGS. 1A and 1B are an elevation view and a side view showing an image non-observing state where image observation is not performed and FIGS. 2A and 2B an elevation view and a side view showing an image observable state where the image observation is possible, and FIGS. 3A to 3C are a partial schematic view.

The eyeglass-type image display device in accordance with the present embodiment is a right-eye type and has a light guiding unit 11 that is provided on a limb unit 3 for a right eye for holding a lens 2 for a right eye of the eyeglass frame 1. The light guiding unit 11 is constituted by plastic, glass and the like and one end thereof is rotatably held by the central portion of the outer lateral side of the limb unit 3 via a holding member 12 so that it selectably extends to the notch part 4 that is formed from the central portion of the lower side along to a portion of the outer lateral side of the limb unit 3. Then, in the state where the user wears the eyeglass frame 1, the light guiding unit 11 is configured so that it can be rotated and positioned manually on the first position which is in the image non-observing state where the light guiding unit 11 evacuates from the front of the right eyeball 13 of the user and extends to the notch part 4 as shown in FIGS. 1A and 1B and on the second position which is in the image observable state where the light guiding unit 11 separates from the notch part 4 and extends to the front of the right eyeball 13 as shown in FIGS. 2A and 2B.

Therefore, the holding member 12 is provided with, for example, a rotating shaft (not shown) projecting from both sides thereof in the direction of the interpupillary distance. In addition, a bearing unit 3a (see FIG. 3B) that rotatably supports the rotating shaft of the holding member 12 and selectably performs positioning on the first position and on the second position is formed in the limb unit 3. It should be noted that the lens 2 may be constituted by a lens having a diopter or simply by a transparent member having no diopter depending on the eyesight of the right eyeball 13 of the user.

Further, the light guiding unit 11 has a shape that forms a part of the outer shape of the limb unit 3. In the present embodiment, the limb unit 3 has a roughly-squared appearance configuration. Therefore, the light guiding unit 11 has a roughly L-shaped appearance configuration, and is configured so that the light is incident on an entering face 11a on one end thereof, reflects off the reflecting faces 11b and 11c, in that order, inside thereof, exits through an eyepiece lens 11d provided on another end thereof in a direction almost opposite to the entering direction, and is guided to the eyeball.

In addition, with respect to the light guiding unit 11, it should be noted that the projected cross-section width thereof in the visual axis direction of the user in the state where it is located on the second position is equal to or less than 4 mm, which is the diameter of human pupil in the normal environment, and the portion thereof that extends to the front of the eyeball of the user is formed in a tapered shape whose width narrows from one end thereof toward another end thereof. In this case, the width is smaller than 4 mm all over the tapered shape portion. Further, the light guiding unit 11 has, when it is located on the second position, a length that does not reach the visual axis of the right eyeball 13 of the user when he/she focuses at infinity On the other hand, as shown in FIGS. 3A and 3B, an endpiece 6 that connects the limb unit 3 and a right temple 5 has a built-in image display unit 14. The image display unit 14 is provided with a display element 15 constituted by a LCD or an organic EL. The display element 15 is opposed to the entering face 11a of the light guiding unit 11 in the state where the light guiding unit 11 is located on the second position as shown in FIGS. 2A and 2B and in addition, the image display face side thereof is provided with a protection window 16.

Thus, as shown in FIG. 3C, in the state where the light guiding unit 11 is located on the second position, the image light of the image displayed on the display element 15 is incident on the entering face 11a of the light guiding unit 11 from outside the lens 2 through the protection window 16, passes the reflecting faces 11b and 11c of the light guiding unit 11 and the eyepiece lens 11d and exits from the light guiding unit 11 toward the right eyeball 13 passing through the lens 2. Therefore, the user can observe the enlarged virtual image of the image displayed on the display element 15 by directing his/her look of the right eyeball 13 to the eyepiece lens 11d.

As described above, in the present embodiment, the light guiding unit 11 is rotatably provided on the limb unit 3, the display unit 14 is embedded in the endpiece 6 and the light guiding unit 11 is rotated manually, thereby switching between the image non-observing state shown in FIGS. 1A and 1B and the image observable state shown in FIGS. 2A and 2B. In addition, in the image non-observing state where the light guiding unit 11 is located on the first position, the light guiding unit 11 forms the outer shape of the limb unit 3, and in the image observable state where the light guiding unit 11 is located on the second position, the user can observe the enlarged virtual image of the image displayed on the display element 15 by directing his/her look of the right eyeball 13 to the eyepiece lens 11d. Therefore, the structure can be simplified and be made compact and light-weight as well, thereby enabling reduction in cost and enabling the user to wear a pair of eyeglasses for a long period of time with ease without feeling that the pair of eyeglasses is heavy.

Moreover, the light guiding unit 11 constitutes an outer shape of the limb unit 3 on the first position in the image non-observing state, thereby preventing the user from feeling the light guiding unit 11 an eyesore and also preventing the appearance and the aesthetic look of the eyeglass frame 1 from being impaired. Further, with respect to the light guiding unit 11, the projected cross-section width in the visual axis direction of the user on the second position in the image observable state is equal to or less than 4 mm, which is smaller than the diameter of the pupil in the normal environment, thereby practically obstructing no field of view. Thus the user can see through the light guiding unit 11. In addition, the light guiding unit 11 is formed to taper off toward the pupil side. Thus the brighter eyesight can be obtained and a see-through effect can be enhanced as well since the light guiding edge can be made narrower. Further, even if the second position of the light guiding unit 11 displaces a little bit and the right eyeball 13 and the optical axis of the eyepiece lens 11d are not aligned, since the entering end of the light guiding unit 11 is thick, it is possible to make vignetting less likely to be generated by the opening of the entering part.

Further, in the state where the light guiding unit 11 is located on the second position, the image light from the display element 15 passes the outside of the lens 2, that is, the image light does not transmit the lens 2, and is incident on the entering face 11a of the light guiding unit 11, thereby preventing decline in the quality of the display image depending on the type of the lens 2. In addition, the image light that is guided by the light guiding unit 11 and exits through the eyepiece lens 11d transmits the lens 2 and is incident on the right eyeball 13, thereby enabling the user to observe the image with eyesight corrected by the lens 2. Thus the adjustment mechanism of the diopter can be omitted.

Second Embodiment

Figure 4:
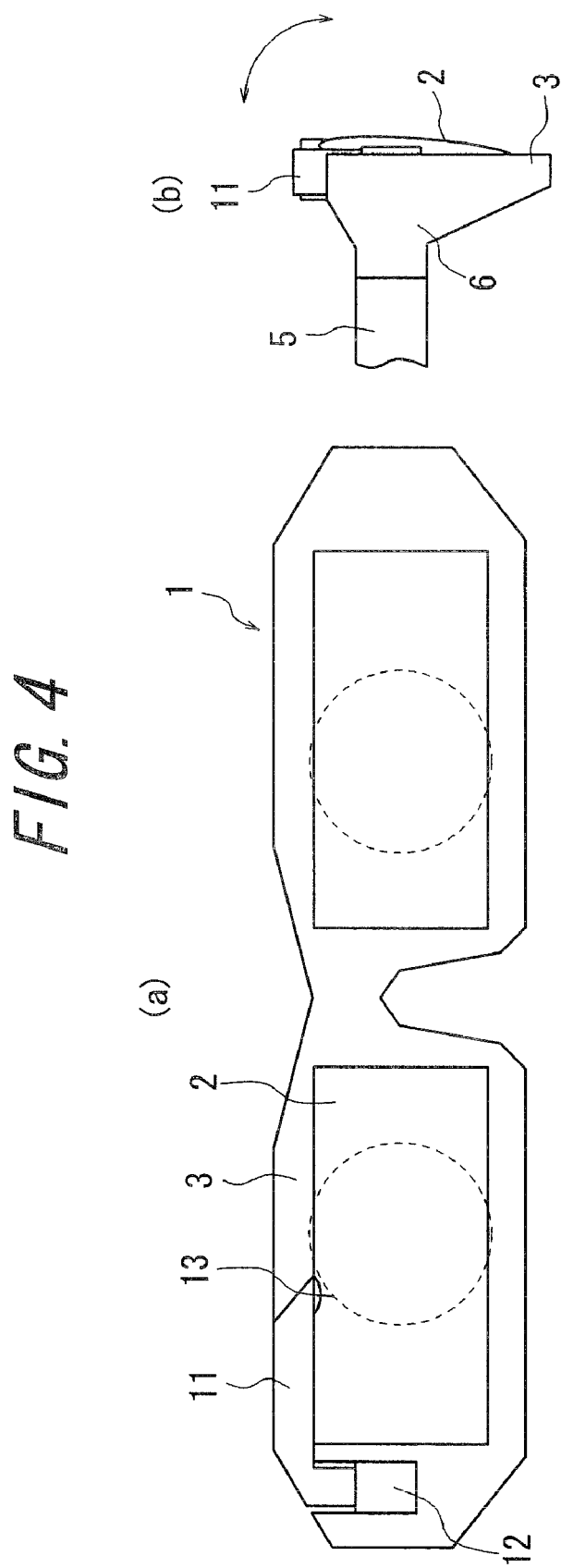
FIG. 4 is an elevation view and a side view showing an image non-observing state of an eyeglass-type image display device in accordance with a second embodiment of the present invention.
Figure 5:
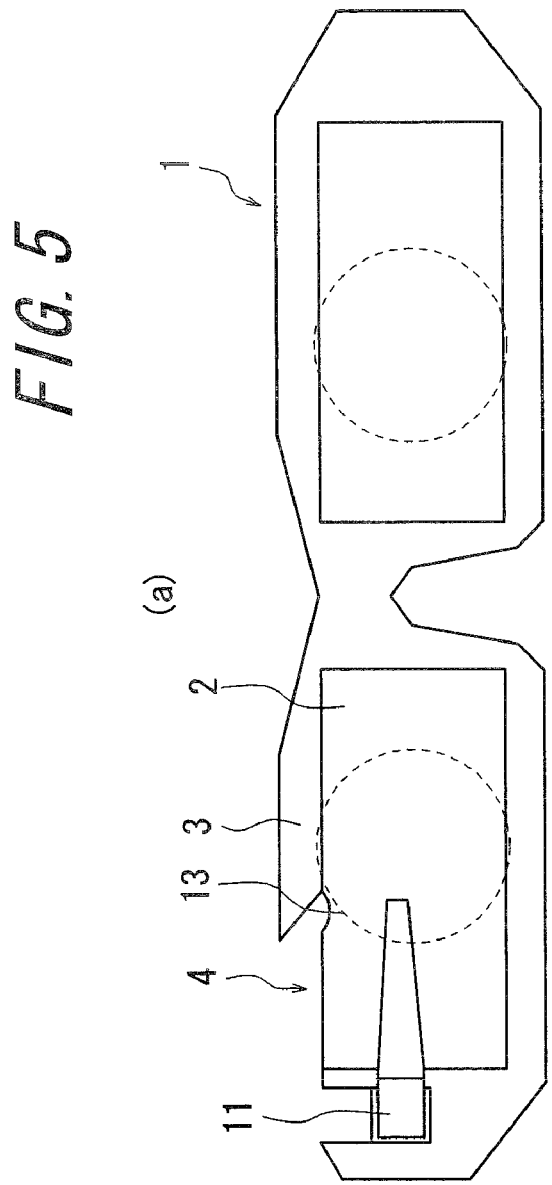
FIG. 5 is an elevation view and a side view showing an image observable state of the eyeglass-type image display device shown in FIG. 4.

FIGS. 4 to 6 show a schematic diagram of an eyeglass-type image display device in accordance with a second embodiment of the present invention. FIGS. 4A and 4B show respectively an elevation view and a side view of the image non-observing state, FIGS. 5A and 5B show respectively an elevation view and a side view of the image observable state and FIGS. 6A and 6B show a partial schematic diagram corresponding to FIGS. 3A and 3B.

In the eyeglass-type image display device in accordance with the present embodiment, relative to the first embodiment, the notch part 4 is formed from the central portion of the upper part along to a portion of the outer lateral side of the limb unit 3, and the light guiding unit 11 is rotatably held to the limb unit 3 so that the light guiding unit 11 selectably extends to the notch part 4. Since the other structures are the same as those of the first embodiment, the same reference numbers are assigned to the same components and explanations thereof are omitted.

Therefore, also in the present embodiment, the same operations and effects as those of the first embodiment can be produced. In particular, in the case of the present embodiment, the light guiding unit 11 rotates from the upper position of the limb unit 3 to near the central portion of the lens 12 to move from the first position shown in FIGS. 4A and 4B to the second position shown in FIGS. 5A and 5B. Therefore, on the second position, the bottom face (the face that comes front of the first position) of the holding member 12 of the light guiding unit 11 can be abutted to the notch face 3c of the limb unit 3, thereby controlling downward rotation. Thus positioning of the second position can be made more easily and stably.

Third Embodiment

Figure 7:
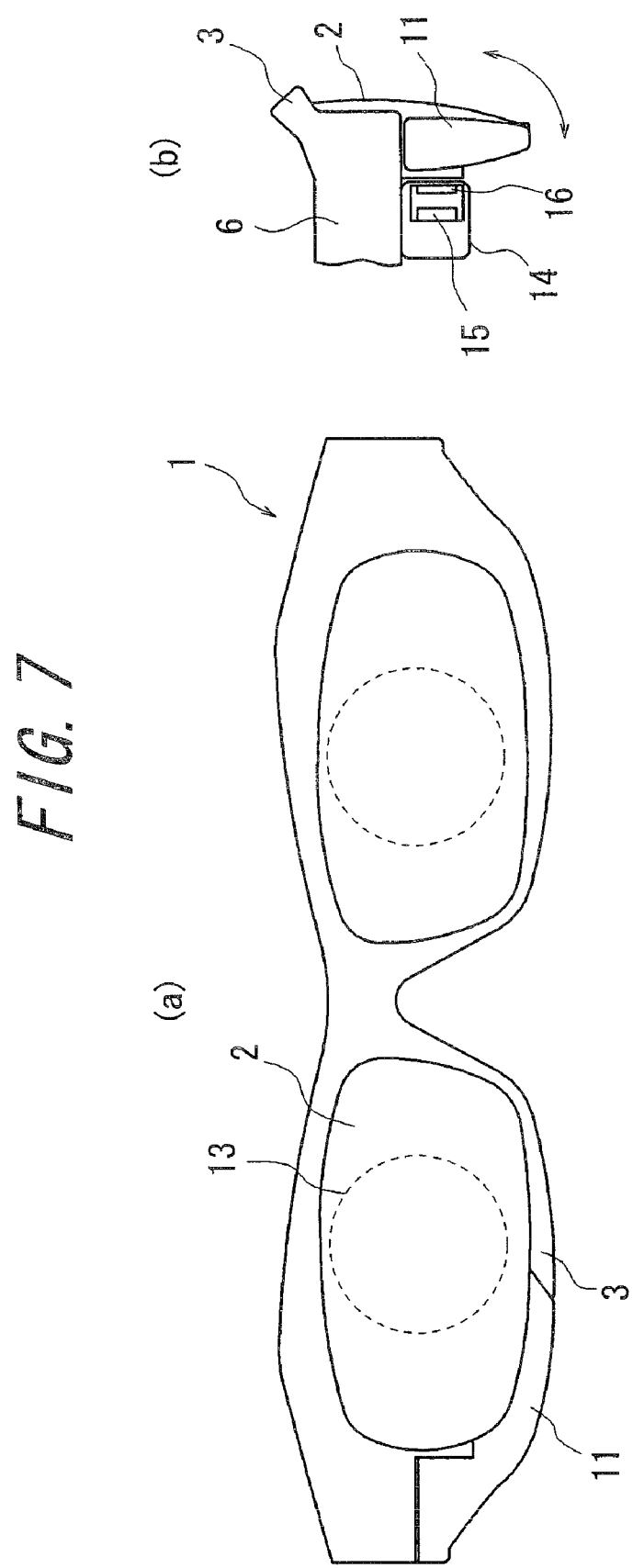
FIG. 7 is an elevation view and a side view showing an image non-observing state of an eyeglass-type image display device in accordance with a third embodiment of the present invention.
Figure 8:
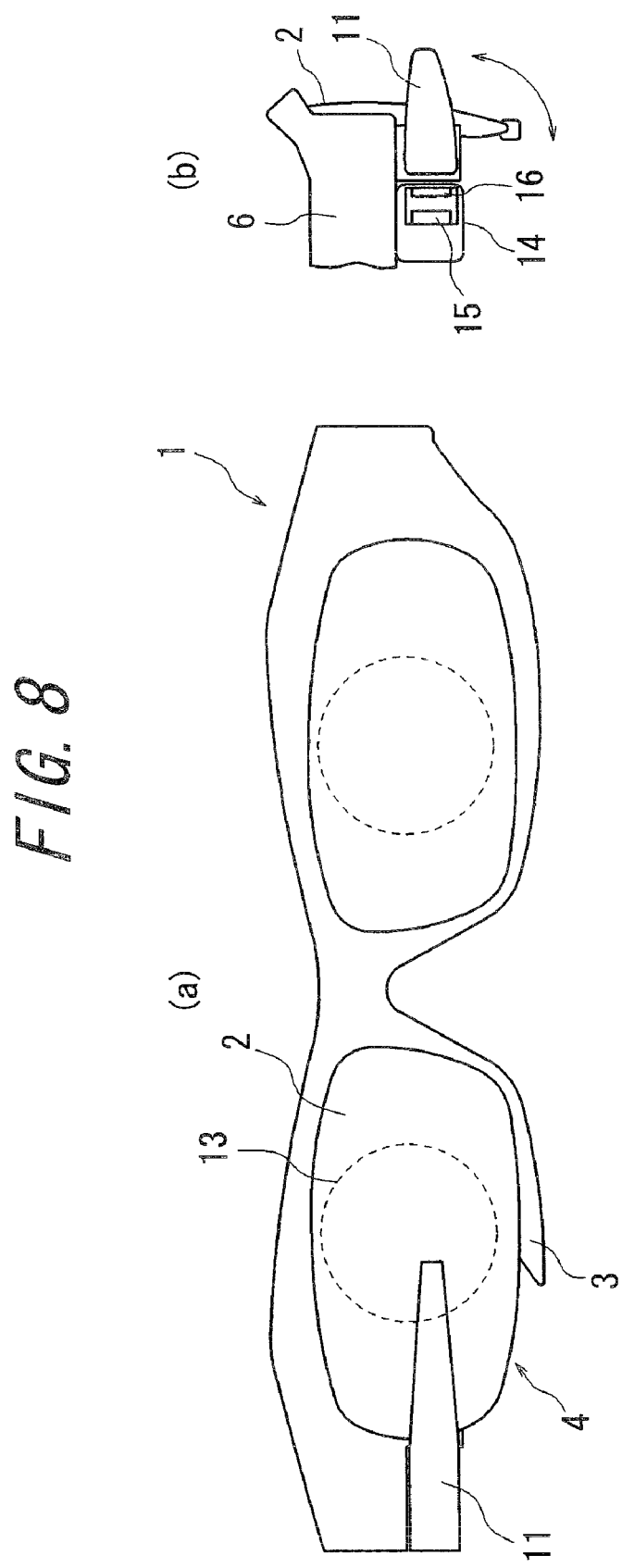
FIG. 8 is an elevation view and a side view showing an image observable state of the eyeglass-type image display device shown in FIG. 7.

FIGS. 7 to 9 show a schematic diagram of an eyeglass-type image display device in accordance with a third embodiment of the present invention. FIGS. 7A and 7B show respectively an elevation view and a side view of the image non-observing state, FIGS. 8A and 8B show respectively an elevation view and a side view of the image observable state and FIGS. 9A and 9B show a partial schematic diagram.

In the eyeglass-type image display device in accordance with the present embodiment, the appearance shape of the limb unit 3 is curved compared to the first embodiment. Thus, in the present embodiment, the light guiding unit 11 is formed in an appearance shape that assumes curve in accordance with the appearance shape of the limb unit 3 so that the light guiding unit 11 forms a part of the outer shape of the limb unit 3 in the image non-observing state where the light guiding unit 11 is located on the first position shown in FIGS. 7A and 7B. Such curved light guiding unit 11 can be constituted, for example, by the known free-form-surface-prism (e.g. JP 3676472 B2). In this case, since the light guiding unit 11 serves as a lens, the eyepiece lens 11d shown in FIG. 1 is no longer needed.

With respect to the light guiding unit 11, the entering end thereof is rotatably cantilevered from the limb unit 3. That is, at the entering end of the light guiding unit 11, a rotating shaft is directly provided in a protruding mariner on the face of the lens 2 side. Then the rotating shaft is rotatably received by the bearing 3a that is formed in the limb unit 3, which allows positioning on the first position and the second position.

In addition, the image light of the image displayed on the display element 15 passes through the protection window 16 and enters into the light guiding unit 11 through the entering face 11a in the state where the image display unit 14 is held by the endpiece 6 and the light guiding, unit 11 is located on the second position shown in FIGS. 8A and 8B. Further, FIGS. 9A and 9B show respectively a partial schematic elevation view and a side view in the state where the light guiding unit 11 is removed. Since the other structures are the same as those of the first embodiment, the same reference numbers are assigned to the same components and explanations thereof are omitted.

Therefore, also in the present embodiment, the same operations and effects as those of the first embodiment can be produced. It should be noted that in the present embodiment, the light guiding unit 11 may be rotatably provided on the upper part of the limb unit 3 as in the case of the second embodiment to obtain the same effects as those described in the second embodiment.

Fourth Embodiment

Figure 10:
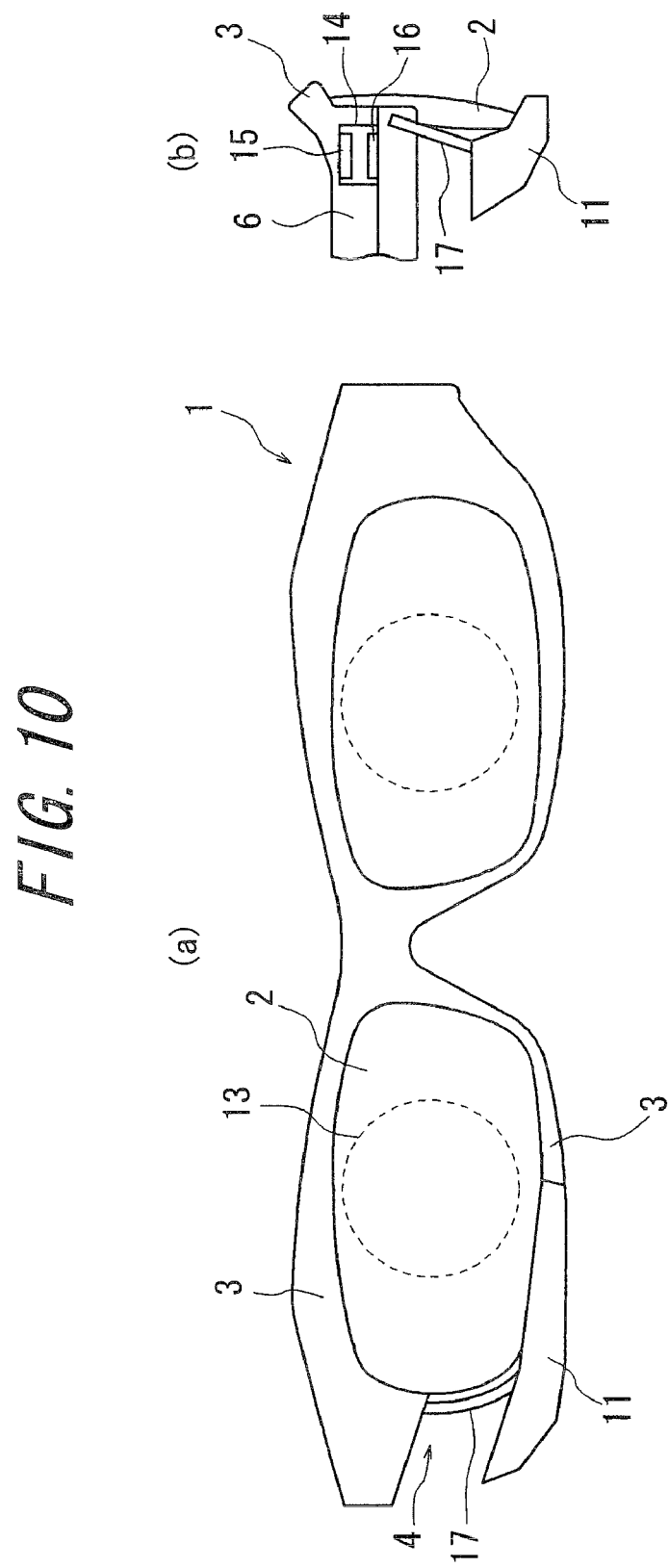
FIG. 10 is an elevation view and a side view showing an image non-observing state of an eyeglass-type image display device in accordance with a fourth embodiment of the present invention.
Figure 11:
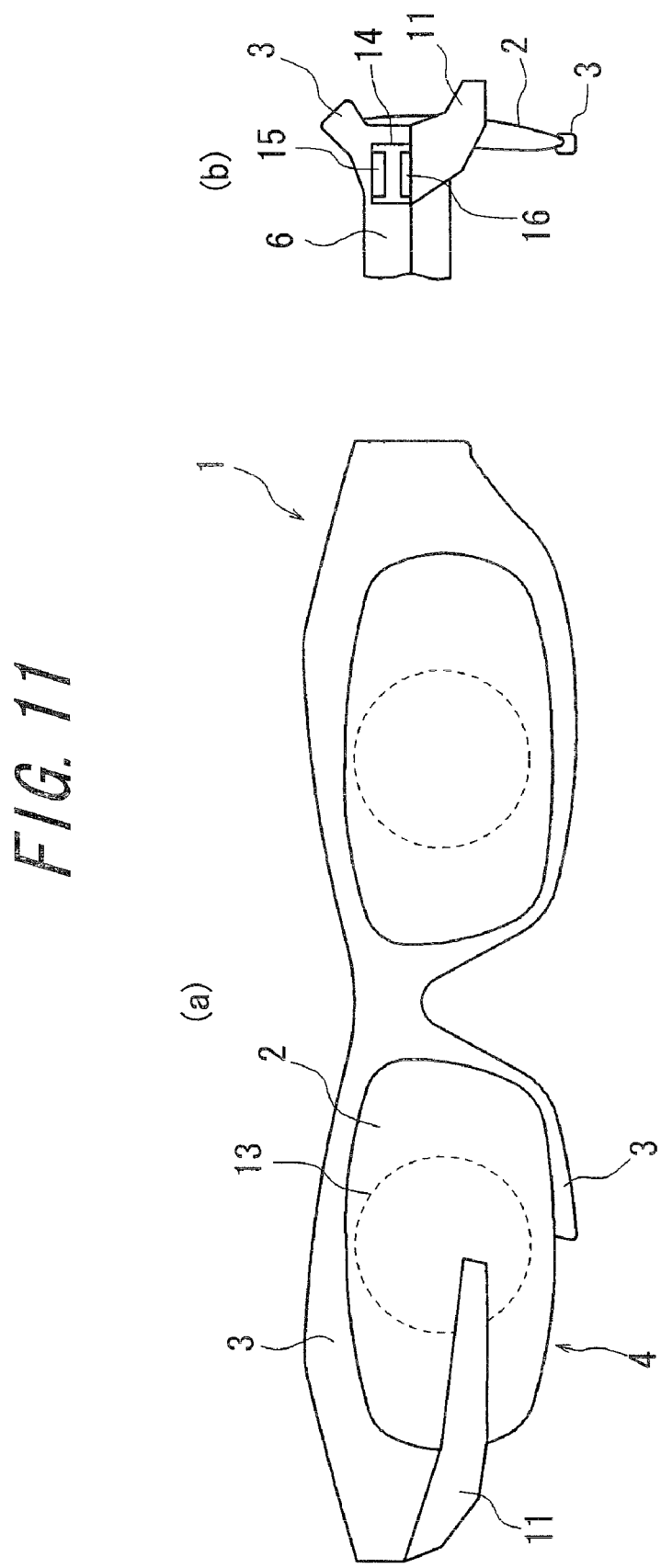
FIG. 11 is an elevation view and a side view showing an image observable state of the eyeglass-type image display device shown in FIG. 10.

FIGS. 10 and 11 show a schematic diagram of an eyeglass-type image display device in accordance with a fourth embodiment of the present invention. FIGS. 10A and 10B show respectively an elevation view and a side view of the image non-observing state and FIGS. 11A and 11B show respectively an elevation view and a side view of the image observable state.

In the eyeglass-type image display device in accordance with the present embodiment, the light guiding unit 11 is provided on the limb unit 3 so that it is slidably by manual to the first position in the image non-observing state shown in FIGS. 10A and 10B and to the second position in the image observable state shown in FIGS. 11A and 11B. Thus, a slide guide 17 is slidably provided on the upper part of the limb unit 3 and the slide guide 17 is supported by the light guiding unit 11.

In the image non-observing state where the light guiding unit 11 is located on the first position, the slide guide 17 is exposed at the notch part 4 of the limb unit 3 along the outer circumference of the lens 2. Then in the image observable state where the light guiding unit 11 is located on the second position, the slide guide 17 slides to the upper part of the limb unit 3 and is housed therein so as not to be exposed.

The light guiding unit 11 is constituted by using, for example, a prism having a planate reflecting face inside thereof and a free-form-surface prism as described in the third embodiment and has a shape that focus a part of the outer shape of the limb unit 3 in the image non-observing state where the light guiding unit 11 is located on the first position.

In addition, the image display unit 14 is embedded in the endpiece 6 and is configured so that, in the state where the light guiding unit 11 is located on the second position, the image light of the image displayed on the display element 15 enters into the light guiding unit 11 through the protection window 16 and exits toward the right eyeball 13 of the user. Other structures are the same as those of the aforementioned first or the third embodiment.

Therefore, also in the present embodiment, the same operations and effects as those of the first embodiment and the third embodiment can be produced. It should be noted that the slide guide 17 can be provided slidably so that it can be housed in the upper part of the limb unit 3, in addition, the slide guide unit 17 can be extended from the upper part along to the lower part of the limb unit 3 and fixedly disposed, and with respect to the slide guide 17, the light guiding unit 11 is slidably supported, thereby enabling positioning selectably to the first position and to the second position. Further, the light guiding unit 11 can be slidably provided on the upper part of the limb unit 3. In this case, the entering end thereof can be abutted to the endpiece 6 on the second position by use of the weight of the light guiding unit 11, thereby making the positioning on the second position easy.

Fifth Embodiment

Figure 12:
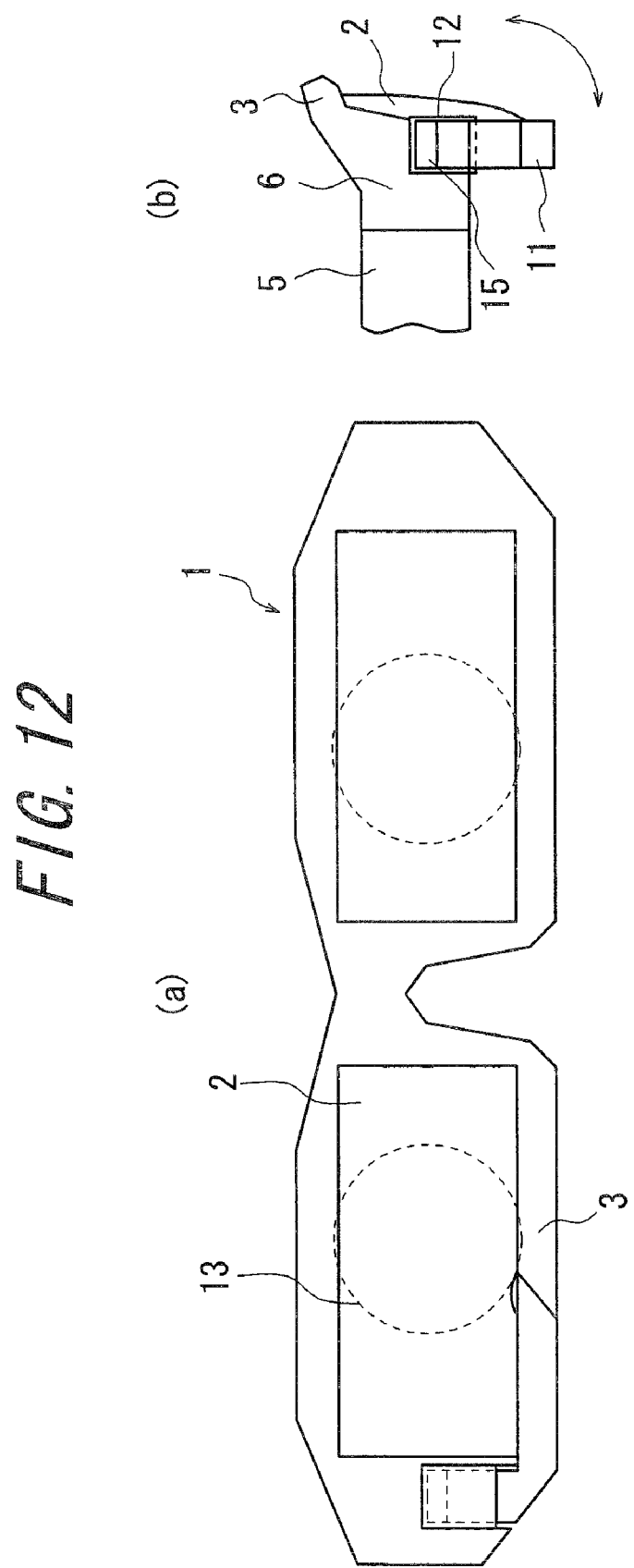
FIG. 12 is an elevation view and a side view showing an image non-observing state of an eyeglass-type image display device in accordance with a fifth embodiment of the present invention.
Figure 13:
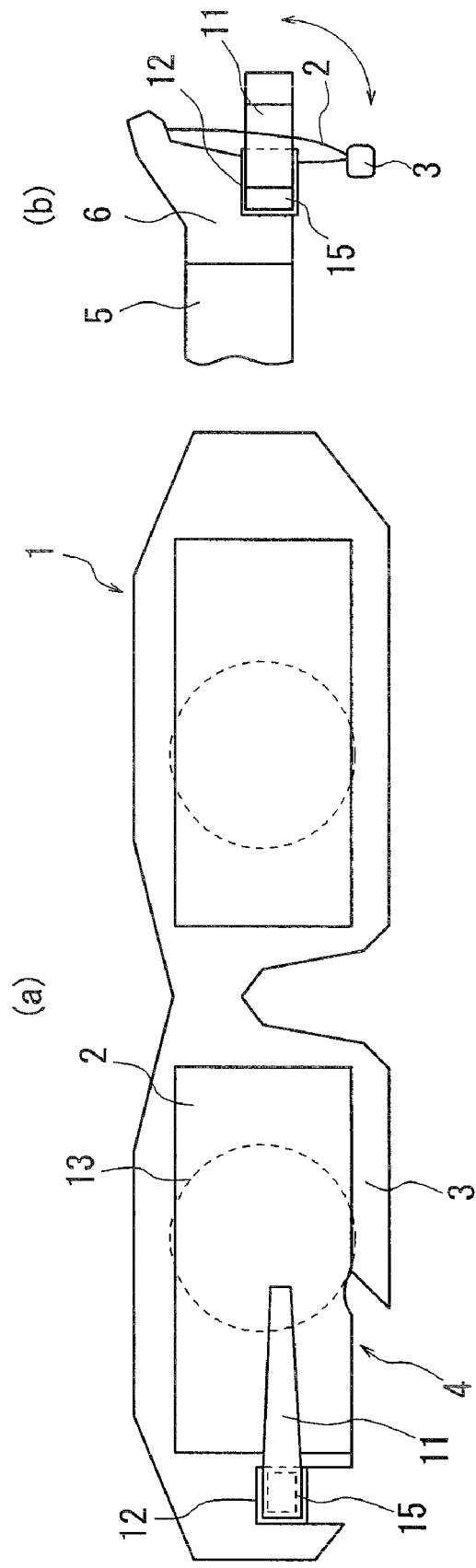
FIG. 13 is an elevation view and a side view showing an image observable state of the eyeglass-type image display device shown in FIG. 12.

FIGS. 12 and 13 show a schematic, diagram of an eyeglass-type image display device in accordance with a fifth embodiment of the present invention. FIGS. 12A and 12B show respectively an elevation view and a side view of the image non-observing state and FIGS. 13A and 13B show respectively an elevation view and a side view of the image observable state.

In the eyeglass-type image display device in accordance with the present embodiment, in the first embodiment, the display element 15 is held to the holding member 12 so that it is opposed to the entering end of the light guiding unit 11, thereby allowing integral rotation thereof with the light guiding unit 11. Since the other structures are the same as those of the first embodiment, the same reference numbers are assigned to the same components and explanations thereof are omitted.

Therefore, also in the present embodiment, the same operations and effects as those of the first embodiment can be produced. In particular, in the present embodiment, the display element 15 is provided on the light guiding unit 11 side to allow integral rotation thereof with the light guiding unit 11, thereby allowing more simple structure compared to the case where the display element 15 is separated from the light guiding unit 11 and improving the assemblability. Thus cost can be reduced. It should be noted that the structure in which the display element 15 is provided on the light guiding unit 11 side in this manner can effectively be applied also to the second to the fourth embodiments.

Sixth Embodiment

Figure 14:
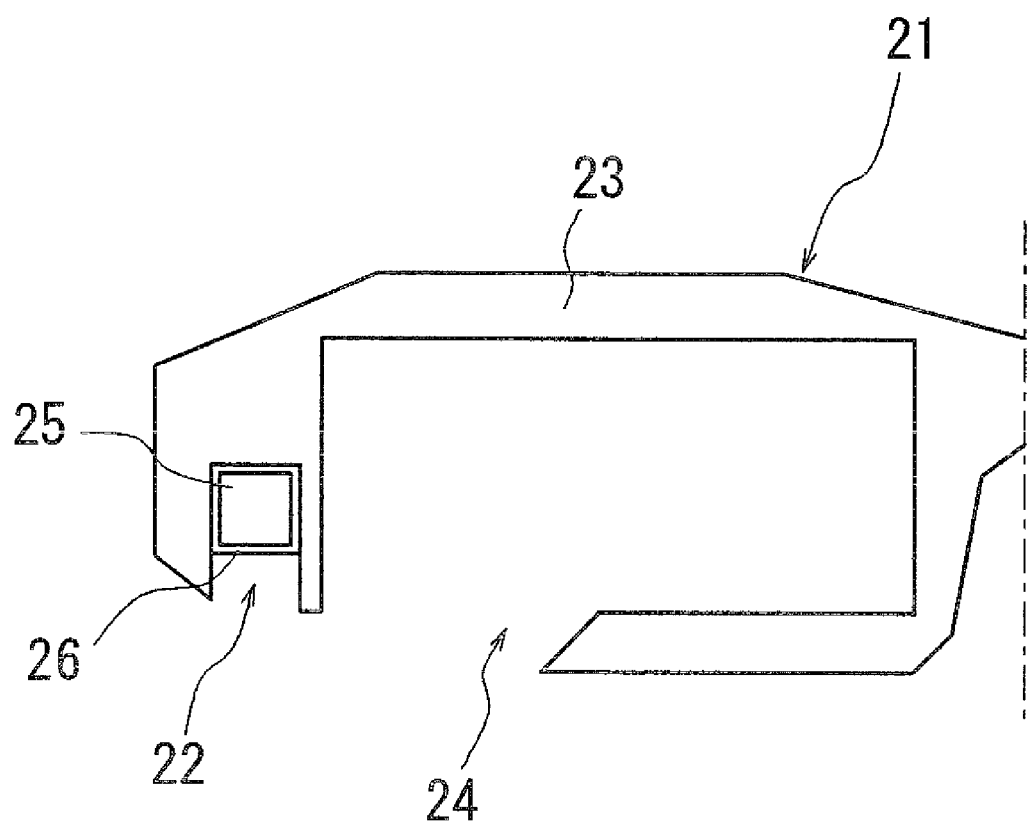
FIG. 14 is a partial elevation view showing a schematic diagram of an eyeglass frame in accordance with a sixth embodiment of the present invention.

FIG. 14 is a partial elevation view showing a schematic diagram of an eyeglass frame in accordance with a sixth embodiment of the present invention. The eyeglass frame 21 constitutes the eyeglass-type image display device in accordance with the first embodiment shown in FIGS. 1 to 3 and includes a light guiding unit mounting unit 22 for displaceably mounting the aforementioned light guiding unit 11 on the first position and the second position, a notch part 24 that is formed in a limb unit 23 to allow the light guiding unit 11 to be located on the limb unit 23 on the aforementioned first position and a display element loading unit 25 for loading an image display unit 14 that includes a display element 15. The light guiding mounting unit 22 is formed in the limb unit 23 and the display element loading unit 25 is formed in the endpiece 26. It should be noted that other components of the eyeglass frame such as temple are not shown.

Therefore, by use of the eyeglass frame 21, as shown in FIGS. 1 to 3, the lens 2 is mounted on the limb unit 23, the light guiding unit 11 is mounted on the light guiding unit mounting unit 22 so as to be rotatable to the first position and to the second position through the holding member 12, and the display element loading unit 25 is loaded with a unitized image display unit 14 having the display element 15 and the protection window 15. Thus the eyeglass-type image display device can be constituted easily.

Seventh Embodiment

Figure 15:
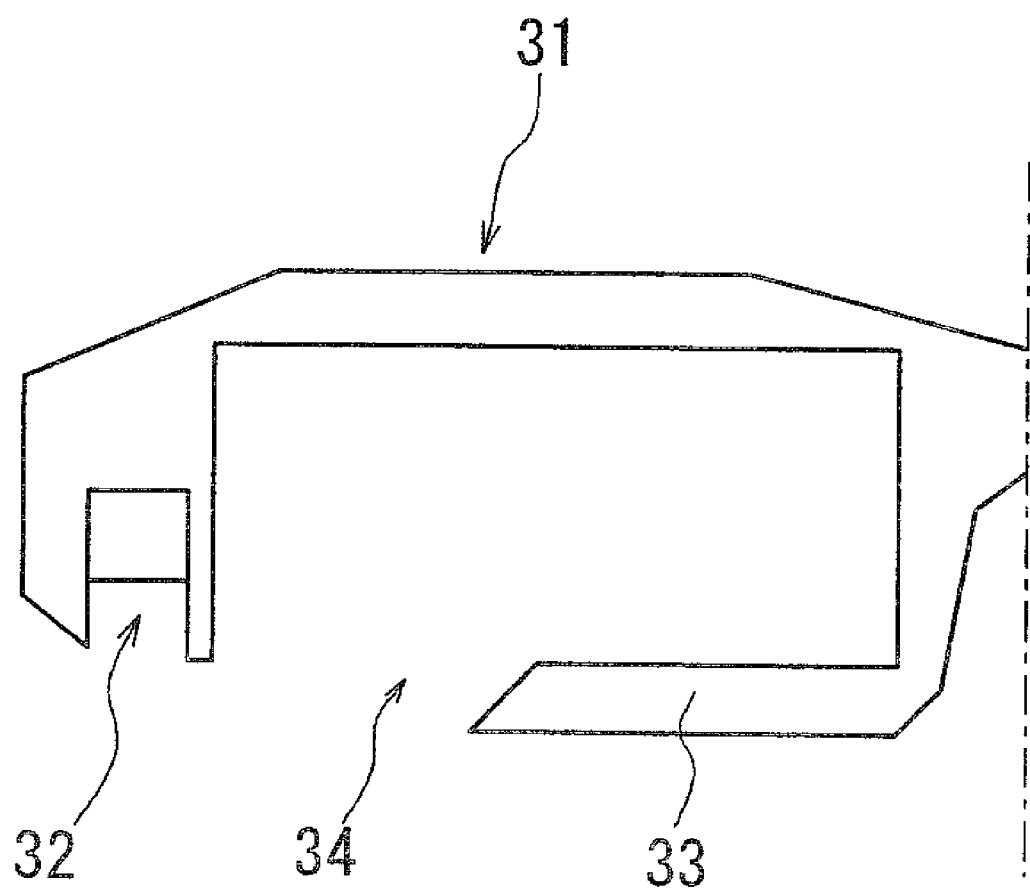
FIG. 15 is a partial elevation view showing a schematic diagram of an eyeglass frame in accordance with a seventh embodiment of the present invention.

FIG. 15 is a partial elevation view showing a schematic diagram of an eyeglass frame in accordance with a seventh embodiment of the present invention. The eyeglass frame 31 constitutes the eyeglass-type image display device in accordance with the fifth embodiment shown in FIGS. 12 and 13 and includes a light guiding unit mounting unit 32 for mounting the aforementioned light guiding unit 11 so as to be displaceable to the first position and to the second position and a notch part 34 that is formed in the limb unit 33 to allow the light guiding unit 11 to be located on the limb unit 33 at the aforementioned first position. The light guiding unit mounting unit 32 is formed in the limb unit 33. It should be noted that other components of the eyeglass frame such as temple are not shown.

Therefore, by use of the eyeglass frame 21, as shown in FIGS. 12 and 13, the lens 2 is mounted on the limb unit 33 and the light guiding unit 11 that is integrally held with the display element 15 through the holding member 12 is mounted on the light guiding unit mounting unit 32 rotatably to the first position and to the second position. Thus the eyeglass-type image display device can be constituted easily.

It should be noted that the present invention is not limited to the aforementioned embodiments, and many variations and modifications can be implemented. For example, in the eyeglass-type image display device in accordance with the aforementioned embodiments, the width of the projected cross-section in the visual axis direction of the user is equal to or less than 4 mm, which is smaller than the diameter of the pupil in the normal environment. However, it is possible to make only the light guiding end part including the exit part of the light guiding unit 11 smaller than the pupil diameter to provide a see-through function. Further, the shape of the light guiding unit 11 is not limited to the tapered shape whose width narrows toward the exit end of the image light, and the width from the entering end side along to the exit end side can be uniform width to enter the image light from the display element 15. It is obvious that, also in this case, a see-through effect can be provided by making the width of the projected cross-section in the visual axis direction of the observer smaller than the pupil diameter on the second position.

In addition, the eyeglass frame in accordance with the present invention is not limited to the structures shown in FIGS. 14 and 15, and can be constituted as an eyeglass frame for constituting the eyeglass-type image display device in accordance with each of the second to fourth embodiments.

Further, the present invention is not limited to the aforementioned right-eye type, and can be constituted as a left-eye type. In addition, it is possible to constitute the present invention by providing a light guiding unit on each limb unit on both eyes and by providing a light guiding unit on upper side and lower side of the limb unit on one side. It is also possible to constitute the present invention as a multi screen type.

What is claimed is:

1. An eyeglass-type image display device comprising a display element for displaying an image and a light guiding unit for guiding an image light of the image displayed on the display element, wherein in a state where the user wears an eyeglass frame, at least the light guiding unit is disposed on a limb unit of the eyeglass frame so as to be displaceable to a first position where the light guiding unit is evacuated from the front of one eyeball of the user and to a second position where the light guiding unit extends to the front of the eyeball and the image light exits therethrough toward the eyeball.

2. The eyeglass-type image display device according to claim 1, wherein
the light guiding unit has a shape that forms a part of outer shape of the limb unit on the first position.

3. The eyeglass-type image display device according to claim 1, wherein
the light guiding unit is provided on the limb unit so as to be rotatable to the first position and to the second position.

4. The eyeglass-type image display device according to claim 1, wherein
the light guiding unit is provided on the limb unit so as to be slidable to the first position and to the second position.

5. The eyeglass-type image display device according to claim 1, wherein
the display element is separated from light guiding unit and is provided on the eyeglass frame so that it is opposed to an image light entering end of the light guiding unit in a state where the light guiding unit is located on the second position.

6. An eyeglass frame used for the eyeglass-type image display device according to claim 5, comprising
a light guiding unit mounting unit for mounting the light guiding unit displaceably to the first position and to the second position;
a notch part foamed in a limb unit so that the light guiding unit is located on the limb unit on the first position; and
a display element loading unit for loading the display element.

7. The eyeglass-type image display device according to claim 1, wherein
the display element is provided on the image light entering end of the light guiding unit so as to be integral and movable with the light guiding unit.

8. An eyeglass frame used for the eyeglass-type image display device according to claim 7, comprising
a light guiding unit mounting unit for mounting the light guiding unit that is integrally provided with the display element so as to be displaceable to the first position and to the second position; and
a notch part formed in a limb unit so that the light guiding unit is located on the limb unit on the first position.

9. The eyeglass-type image display device according to claim 1, wherein
with respect to the light guiding unit, a width of a projected cross-section in a visual axis direction of the user is, on the second position, equal to or less than 4 mm, which is smaller than a diameter of a pupil of the eyeball.

10. The eyeglass-type image display device according to claim 1, wherein
the light guiding unit is configured so that, in a state where the light guiding unit is located on the second position, the image light from the display element passes outside an eyeglass lens and enters into the light guiding unit and the image light that exits from the light guiding unit transmits the eyeglass lens and is incident on the eyeball.

* * * * *